United States Patent [19]

Nakano

[11] Patent Number: 4,800,789
[45] Date of Patent: Jan. 31, 1989

[54] TOOL SLIDE DEVICE IN MACHINE TOOL

[75] Inventor: Kyuzo Nakano, Niigata, Japan

[73] Assignee: Nigata Engineering Co., Ltd., Tokyo, Japan

[21] Appl. No.: 19,809

[22] Filed: Feb. 27, 1987

[30] Foreign Application Priority Data

| Feb. 27, 1986 | [JP] | Japan | 61-27744[U] |
| Feb. 27, 1986 | [JP] | Japan | 61-42724 |
| Jul. 4, 1986 | [JP] | Japan | 61-157712 |
| Jul. 4, 1986 | [JP] | Japan | 61-157713 |

[51] Int. Cl.[4] .................................................. B23B 5/18
[52] U.S. Cl. .......................................... 82/2 E; 82/9; 82/20; 82/32; 82/70.2; 82/74
[58] Field of Search .................. 82/74, 73, 72, 70.2, 82/62, 61, 9, 40 R, 40 A, 2 E, 20, 32, 31, 2 R, 39; 409/199

[56] References Cited

U.S. PATENT DOCUMENTS

| 53,058 | 3/1866 | Thomas | 82/31 |
| 2,148,293 | 5/1937 | Groene | 82/9 |
| 3,848,489 | 11/1974 | Santana | 82/70.2 |
| 4,090,422 | 5/1978 | Berbalk | 82/9 |
| 4,384,333 | 5/1983 | Maecher | 82/9 |

FOREIGN PATENT DOCUMENTS

| 3039986 | 11/1981 | Fed. Rep. of Germany . |
| 3125195 | 3/1982 | Fed. Rep. of Germany . |
| 1328015 | 6/1971 | United Kingdom . |
| 1380523 | 2/1973 | United Kingdom . |
| 2045138 | 2/1980 | United Kingdom . |
| 2154914 | 9/1985 | United Kingdom . |

Primary Examiner—Frederick R. Schmidt
Assistant Examiner—Blynn Shideler
Attorney, Agent, or Firm—Sughrue, Mion, Zinn, Macpeak & Seas

[57] ABSTRACT

A machining apparatus for circumferentially machining a stationary shaft-like work-piece. An inwardly moving tool slide rest is mounted on a main spindle driving gear which is driven by a common gear. A feed gear is concentrically mounted with the main spindle driving gear and is also driven by the common gear but has a differing number of teeth from the main spindle driving gear. A cam surface in the feed gear interacts with a cam follower in the main spindle driving gear so that the relative rotation of the feed gear and the main spindle driving gear radially moves the cam follower, which radially drives the tool slide rest. The end of a machining cycle can be detected by a switch linked to the motion of the tool slide rest. Overload in the cutting can be detected by driving the main spindle driving gear and the feed gear with two gears, one of which can slip. Slippage indicates overload. If two such machining units are used, it is preferable that two pairs of guide surface be provided on the bed with adjacent ones of the machining units and the tail stocks holding the work-piece being mounted on different ones of the guide surfaces.

10 Claims, 7 Drawing Sheets

TOOL SLIDE DEVICE IN MACHINE TOOL

BACKGROUND OF THE INVENTION

Field of the Invention

The present invention relates to a tool slide rest in a machine tool.

More particularly, one aspect of the invention relates to a tool slide rest using the turning of a tool head around a stationary work piece to thereby cut the work piece.

Even more particularly, the invention, relates to a tool slide device in a machine tool in which the machine tool is subject to emergency stopping when feeding of a cutting tool relative to a work becomes overloaded.

Another aspect of the invention relates to a tool slide device in which the detection of one cycle of cutting tool sliding motion relative to a work-piece is made by direct use of the motion of the slide rest.

Yet another aspect of the invention relates to a shaft-like work-piece machining apparatus in which tail stocks for supporting opposite ends of a shaft-like work-piece and machining units for machining the external diameter of the shaft-like work-piece are disposed so as to be slidably movable on independent slide surfaces.

Background of the Invention

Various types of machine tools for cutting shaft-like work-pieces, such as crank-pins of crank-shafts, are known as described in Japanese Patent Publication No. 45726/1981, Japanese Patent Unexamined Publication No. 80092/1978, and the like.

Among these, machine tools such as pin turning lathes are used to cut a shaft-like work-piece to have given diameters in such a manner that the shaft-like work-piece is fixedly held at its opposite ends by tail stocks and a tool head is turned around the shaft-like work-piece while a tool rest is fed.

These tail stocks support opposite ends of a shaft-like work-piece to be indexed or rotated, and machining units cut the outer circumference of the shaft-like work-piece supported by the tail stocks. These tail stocks and machining units are arranged to be movable along guide surfaces provided on a bed.

Another type of machine tool is the rotating shaft type in which a shaft-like work-piece grasped at its opposite ends respectively by eccentric chucks of a pair of main spindle heads is rotated while a tool rest provided at a stationary side is fed to thereby cut the outer circumference of the work-piece. In contrast, the machine tools of the stationary shaft type as described above in which a tool is turned with a work-piece held stationary are advantageous in that the chucking mechanism is not complicated and is not so large in size. Also, the machine body does not need to have such a strong structure as to withstand vibrations owing to high-speed unbalanced turning. Furthermore, the stationary shaft machine tools can be designed without taking into consideration the relative phase displacement between the opposite main spindles caused by backlash in the drive gear trains of the main spindles or a difference in torsional stiffness between the main spindles. However, the machine tools of this type are disadvantageous in that both the gear driving mechanism for turning the tool head around the shaft-like work-piece to be machined and the in-feed mechanism for feeding the tool rest become complicated in structure and large in size. Accordingly, the work-piece cannot be cut at a high speed because of the difficulty in turning the tool head at a high speed.

In the stationary shaft-like work-piece machining apparatus of this type, the guide surfaces are commonly used for rotatably supporting the tail stocks as well as for rotatably supporting the machining units. Accordingly, covers for securely protecting the guide surfaces against chips of metal cannot be provided at places where a plurality of machining units approach each other or where a machining unit and an adjacent tail stock approach each other. Accordingly, the guide surfaces are apt to be worn out. Furthermore, abrasion of the guide surfaces is locally unevenly distributed in the area where the plurality of machining units sliding on the guide surfaces overlap each other. Accordingly, machining accuracy cannot be maintained constant.

When the cutting tool is worn out or broken down after much use, the cutting speed decreases and the cutting resistance greatly increases, perhaps resulting in an overloaded state in feeding the cutting tool. However, because no overload detecting means has been provided before in these types of rotating tool slide rests, it has been appreciated that work-pieces to be machined by the apparatus might be radially transformed or broken down or that the slide rest and the like might be destroyed.

Furthermore, the tail stocks and the machining units should be supported over guide surfaces respectively spanning the whole width of the machine base. Accordingly, if saddles or the like for supporting those tail stocks and machining units have stiffness to endure a load in machining, the apparatus becomes large in size and complicated in structure as a logical consequence. Accordingly, there exists a problem in that the bed should be made large in size and heavy in weight to support the heavy structure.

SUMMARY OF THE INVENTION

The present invention has been achieved to eliminate the above-mentioned problems in the prior art.

Accordingly, an object of the invention is to provide a tool slide rest in a machine tool in which it is possible to simplify the tool sliding mechanism in structure, to reduce it in weight, and to make the machining speed high.

Another object of the present invention is to provide a tool slide device in a machine tool, in which the reduction gear train is made unnecessary so as to simplify the arrangement in the vicinity of the main spindle and it is made possible to provide a safety mechanism in feeding the cutting tool.

A further object of the present invention is to provide a shaft-like work-piece machining apparatus in which it is possible to reduce abrasion of the guide surfaces and it is also possible to reduce the bed including the guide surfaces in weight as well as in size.

Yet a further object of the present invention is to provide a tool slide rest in a machine tool, in which the machine tool is safely maintained to prevent the transformation and destruction of the work-pieces and parts such as a slide rest and the like even if the feeding of the cutting tool is overloaded owing to abrasion or breakdown of the cutting tool.

The shaft-like work-piece machining apparatus of the invention has tail stocks for supporting opposite ends of a shaft-like work-piece to be machined and one or more rotating machining units for machining the outer circumference of the stationary shaft-like work-piece.

The tool slide rest in a machine tool, according to a first aspect of the present invention, comprises a hollow main spindle rotatably provided on a machining unit body. A concentric main spindle driving gear is integrally mounted on the hollow main spindle. A feed gear is mounted on the hollow main spindle so as to be in opposition to the main spindle driving gear and so as to be rotatable relative to the hollow spindle. The feed gear has teeth different in number from the teeth of the spindle driving gear. A motor drives the spindle driving gear and the feed gear to rotate them. A tool slide rest is disposed on the spindle driving gear so as to be movable in the radial direction of the spindle driving gear. The tool slide rest has a cutting tool projecting toward an outer circumference of a shaft-like work-piece to be machined. An in-feed cam groove is annually formed in the feed gear so that a cam follower attached to the tool slide rest is urged against the cam groove so as to engage therewith.

Another aspect of the invention additionally includes a mechanism directly responsive to motion of the tool slide rest for detecting a one-cycle point of sliding motion of the cutting tool owing to a phase displacement in rotation between the main spindle driving gear and the feed gear.

According to a third aspect of the present invention, pairs of parallel guide surfaces are provided to guide the tail stocks and the machining units so as to be movable on a bed. The parallel guide surfaces are arranged such that an adjacent one of the tail stocks and one of the machining units are disposed between different two of the guide surfaces.

According to the first aspect of the present invention, the main spindle driving gear is rotated by the motor so that the cutting tool is turned together with the tool slide rest around the shaft-like work-piece to be machined. Both the main spindle driving gear and the feed gear are rotated by the motor to produce a rotational phase displacement between the two gears so that the slide rest is fed inwards by the rotational phase displacement and the cam groove. Accordingly, the sliding mechanism of such a type in which a tool is turned with a work-piece held stationary can be simplified in structure and reduced in weight.

According to the second aspect of the present invention, when the main spindle driving gear and the feed gear rotate, a phase displacement in rotation occurs between the two gears. The cam follower traces the cam groove in response to the rotational phase displacement, so that the slide rest is fed inwards. When one-cycle operation of the slide rest is completed owing to the lead of the cam groove, the one-cycle detecting mechanism operates in response to the motion of the slide rest to detect the one cycle point. Accordingly, the one-cycle detecting mechanism can operate securely at every machining cycle of the work. Furthermore, no gap occurs between the positions of the cycle motion and in addition, the aforementioned objects of the invention can be attained.

According to the third aspect of the present invention, adjacent ones of the tail stocks and of the machining units are disposed between different two guide surfaces so that the tail stocks and the machining units are independently guided. Accordingly, abrasion of the respective guide surfaces can be reduced and loads on the respective guide surfaces can be reduced.

According to the fourth aspect of the invention, intermediate gears are disposed concentrically with each other and provided with teeth the same in number as each other. The intermediate gears are arranged to transmit the rotation of the motor to the main spindle driving gear and the feed gear separately form each other. An overload detecting mechanism is arranged to be operated in response to a displacement in rotation between the intermediate gears when cutting resistance becomes larger than feed power owing to a phase displacement in rotation between the main spindle driving gear and the feed gear or in other words when the phase displacement in rotation between the gears becomes zero.

DETAILED DESCRIPTION OF THE PREFERRED EMBODIMENTS

A first embodiment of the invention will be described in detail with reference to the drawings.

Figures 1, 2:
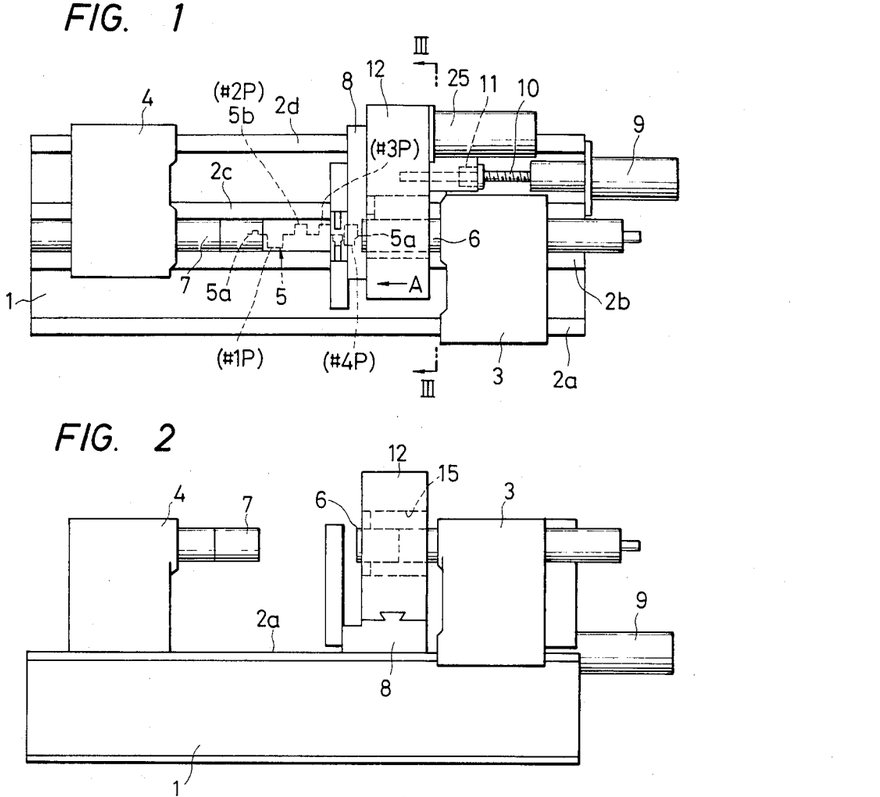
FIG. 1 is a plan view of a crank-shaft cutting machine tool having a tool slide rest according to the invention.
FIG. 2 is a front view of the same.
Figure 3:
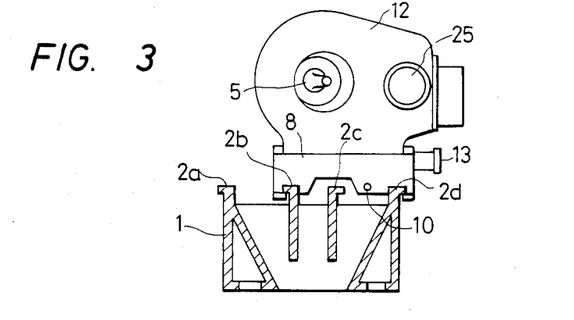
FIG. 3 is a sectional view taken along the line III—III of FIG. 1.
Figure 4:
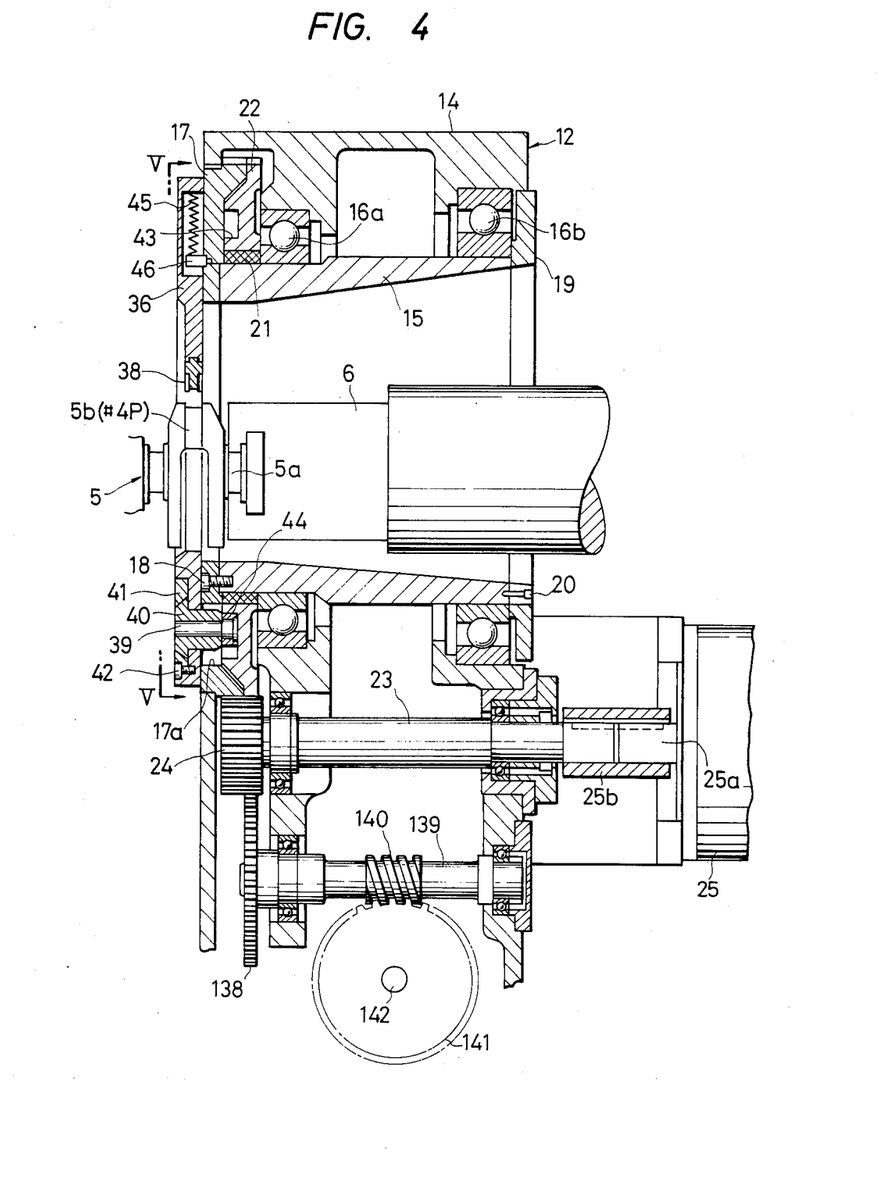
FIG. 4 is a sectional view showing an example of the tool slide rest according to the invention.
Figure 5:
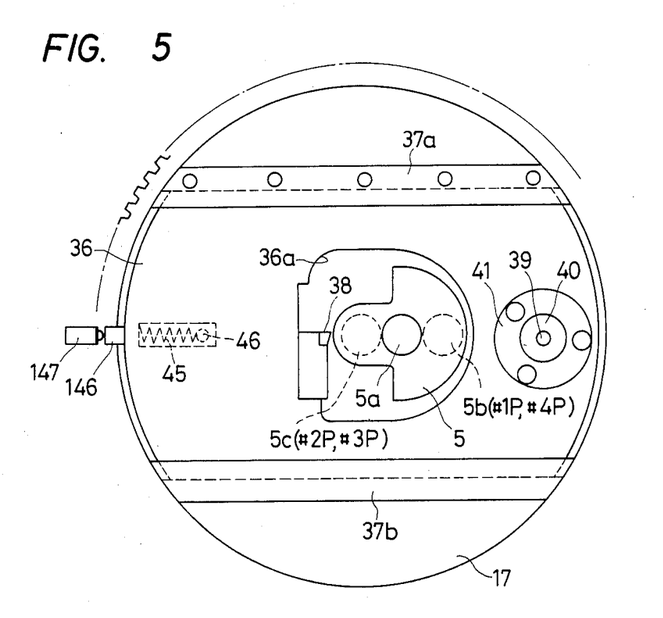
FIG. 5 is a side view along the line V—V of FIG. 4.

FIGS. 1, 2 and 3 are respectively a plan view, a front view and a sectional view taken along the line III—III of FIG. 1, of a machine tool having a tool slide rest according to the invention. FIGS. 4 and 5 show the detail of the tool slide rest according to the invention.

In FIGS. 1 to 3, a bed 1 is provided with four guide surfaces 2a, 2b, 2c and 2d longitudinally formed on the bed 1 and transversely arranged with separation therebetween. A first tail stock 3 is located at one of the longitudinally opposite ends of the bed 1 and is arranged to be longitudinally movable over both the first guide surface 2a and the third guide surface 2c located on the rear side of the second guide surface 2b which is adjacent to the first guide surface 2a. A second tail stock 4 is located at the other longitudinal end of the bed 1 and which is arranged to be longitudinally movable over the other guide surfaces, i.e. over both the second guide surface 2b and the fourth guide surface 2d located on the rear side of the third guide surface 2c. The tail stocks 3 and 4 respectively have chucks 6 and 7 which are arranged on the same axis to grasp a shaft-like work piece, for example, a crank-shaft 5 at its opposite journal portions 5a respectively. Hydraulic cylinders individually operate the respective chucks 6 and 7, and indexing mechanisms individually index the machining position of respective crank-pins 5b of the crank-shaft 5. The hydraulic cylinders and indexing mechanisms are mounted within the respective tail stocks 3 and 4 (the cylinders and the mechanisms are known and therefore not shown in the drawings). A saddle 8 is located near the first tail stock 3 between the tail stocks 3 and 4 and is arranged to be movable in the longitudinal direction of the bed 1 over both the second and fourth guide surfaces 2b and 2d. An NC servo-motor 9 is mounted on the bed 1 in correspondence to the saddle 8. A ball screw 10 arranged to be rotated by the servo-motor 9 is thread-engaged with a ball nut 11 disposed at the saddle 8, so that the saddle 8 is driven by the servo-motor 9 to move in the axial direction of the crank-shaft 5. A machining unit 12 is disposed on the saddle 8 so as to be movable in the direction perpendicular to the direction of movement of the saddle 8. The machining unit 12 is moved perpendicularly to the saddle 8 by a hydraulic cylinder 13 or the like provided on the saddle 8.

As shown in FIGS. 4 and 5, the machining unit 12 has a hollow main spindle 15 which is disposed within a unit body 14 so as to pass through the machining unit body 14 in the same direction as the moving direction of the saddle 8. The hollow main spindle 15 is supported by ball bearings 16a and 16b so as to be rotatable within the machining unit body 14. An annular main spindle driving spur gear 17 is fixedly attached by a bolt 18 to the front end of the hollow spindle 15 and is concentrically integral therewith. A bearing pressing 19 is integrally fixedly attached by a bolt 20 to the rear end of the hollow main spindle 15. The respective ball bearing 16a and 16b are preloaded by the bearing pressing 19, the main spindle driving gear 17, and a collar 21 interposed between the main spindle driving gear 17 and the ball bearing 16a so as to be fitted to the hollow main spindle 15. A ring-like feed gear 22 is fitted to the circumference of the collar 21 fitted to the front end circumference of the hollow main spindle 15 so that the feed gear 22 is rotatable relative to the hollow main spindle 15. The feed gear 22 has a diameter equal to the diameter of the main spindle driving gear 17 and has teeth suitably reduced in number by one or more than the main spindle driving gear 17.

The main spindle driving gear 17 and the feed gear 22 are engaged by a common pinion gear 24 which is mounted on one end of a drive shaft 23 rotatably movably supported on the unit body 14. The opposite end of the drive shaft 23 is connected through a coupling to a rotary shaft 25a of a servo-motor 25 mounted on the rear surface of the unit body 14.

A tool slide rest 36 having a hole 36a (FIG. 5) for insertion of the crank shaft is supported so as to be slidable in the diametric direction of the main spindle driving gear 17 by a pair of retainers 37a and 37b which are removably fixed by bolts or the like onto the front surface of the main spindle driving gear 17. A cutting tool 38 for cutting the outer shape of a shaft-like workpiece such as a crank-pin or the like is provided on the internal wall of the central hole 36a so as to project inwards. A bracket 40 for supporting a roller shaft 39 is disposed at the one end of the tool slide rest 36 so as to pass through the tool slide rest 36 in the longitudinal direction. The bracket 40 is integrally mounted on the tool slide rest 36 by a taper ring 41 and bolts 42. A protrusion of the bracket 40 projecting toward the main spindle driving gear 17 is inserted into a hole 17a which is formed through the main spindle driving gear 17 and which has a sufficiently larger diameter than the external diameter of the bracket 40. A roller-type cam follower 44 is mounted on the roller shaft 39 at an extending end thereof extending toward the feed gear 22 so that the cam follower 44 engages with a cam groove 43 which annularly forms a contact surface of the feed gear 22 at the side of the main spindle driving gear 17.

Figure 7:
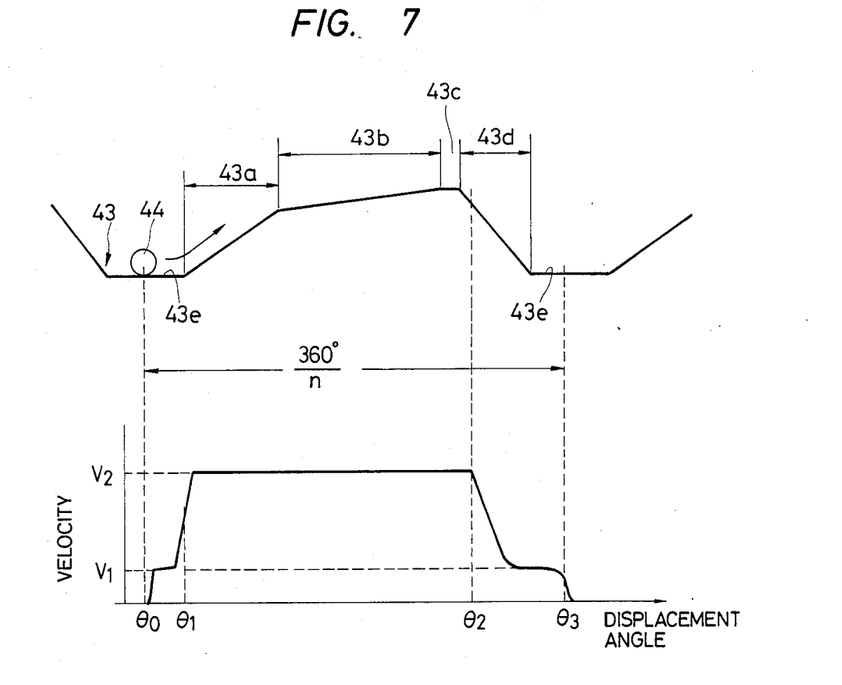
FIG. 7 is both a development view for explaining the cutting tool in-feed cam groove in the invention and a speed pattern graph is the main spindle servo-motor corresponding to the cutting tool in-feed cam groove.

As shown in FIG. 7, the cam groove 43 has one or more cam surfaces each composed of a rapid traverse lead portion 43a, a cut-and-feed lead portion 43b, a dowel lead portion 43c, a quick return lead portion 43d, and a zero lead portion 43e in order to give the cutting tool 38 a motion in the in-feed direction. Assuming that the respective cam surface gives the cutting tool 38 one cycle of its movement, the cam surfaces are formed so as to provide n cycles (n being an integer), and the cam surfaces are equidistantly formed on the circumference of the cam groove 43. A compression spring 45 is mounted on the inner side of the other end of the tool slide rest 36 opposite to the position of the cam follower 44 in order to bias the cam follower 44 against the respective lead portion 43a of the cam groove 43 to thereby eliminate backlash. The opposite ends of the compression spring 45 are respectively supported by the tool slide rest 36 and a stud 46 fixed on the main spindle driving gear 17.

Figure 6:
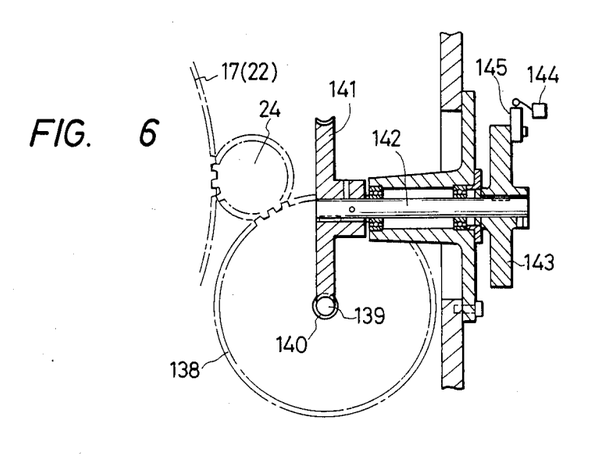
FIG. 6 is a sectional view for explaining the servo-motor controller in the invention.

The pinion gear 24 is engaged by a gear 138 which is fixedly mounted on an intermediate shaft 139 rotatably movably supported by the machining unit body 14. A worm 140 mounted on the intermediate shaft 139 at its central portion is engaged with a worm wheel 141 as shown in FIG. 6. A disc 143 is fixedly attached to a shaft 142 for supporting and rotating the worm wheel 142, and a dog 145 for operating a limit switch 144 is mounted on the disc 143.

The gear ratio among the pinion gear 24, the gear 138, the worm 140 and the worm wheel 141 is selected to be such that the worm wheel 141 makes one revolution to cause the dog 145 to operate the limit switch 144 when a phase difference of 360°/n occurs between the main spindle driving gear 17 and the feed gear 22, because the limit switch 144 should be actuated to rapidly brake the servo-motor 25 whenever one cycle of machining for the crank-pin 5b by the cutting tool 38 owing to the cam groove 43 is completed.

Furthermore, in FIG. 5, a dog 46 for stopping the main spindle driving gear 17 together with the hollow main spindle 15 at a fixed position is provided at the other end of the tool slide rest 36 so as to project therefrom. A limit switch 147 is arranged in opposition to the dog 146 so as to be operated by the tool slide rest 36 when the tool slide rest 36 reaches the quick return end.

The operation of the thus arranged embodiment is described below in detail.

In the case where the crank-pins 5b of the crank-shaft 5 are cut by turning the cutting tool with the workpiece held stationary, first the tail stock 3 is moved respectively over both the first and third guide surfaces 2a and 2c and the tail stock 4 is moved over both the second and fourth guide surfaces 2b and 2d by a distance corresponding to the length of the crank-shaft 5 and are fixed respectively at positions suitable for the length of the crank-shaft 5. Thereafter the opposite journals 5a of the crank-shaft 5 are grasped by the chucks 6 and 7 of the tail stocks 3 and 4, respectively. At this time, the respective indexing mechanisms operate the chucks 6 and 7 to position the crank-shaft 5 with respect to its rotational direction, so that the crank-pins 5b of #1P and #3P are located in parallel to the core in the respective journal 5a.

By driving the servo-motor 9 to rotate the ball screw 10, the saddle 8 is moved in the direction of the arrow A of FIG. 1 so that the cutting tool 38 is positioned so as to be opposite to one of the crank-pins 5b, for example, crank-pin 5b of #4P. After completion of positioning of the cutting tool 38 with respect to the #4P crank-pin 5b, the hydraulic cylinder 13 is operated to move the machining unit 12 to such a position that the axis of the hollow main spindle 15 accords with the center of the crank-pins 5b of #1P and #4P to thereby shift the operation of the machine tool into a crank pin cutting mode.

When the servo-motor 25 for cutting operation is started owing to the setting of the cutting mode of the machine tool, the rotation of the motor is transmitted to both the main spindle driving gear 17 and the feed gear 22 through the drive shaft 25 and the pinion gear 24. Accordingly, the main spindle driving gear 17 rotates together with the hollow main spindle 15, and, at the same time, the feed gear 22 rotates around the collar 21.

Let M be the number of teeth of the main spindle driving gear 17. Then, the number of teeth of the feed gear 22 is M−1. Accordingly, while the main spindle driving gear 17 turns N times, the feed gear 22 turns N+1 times. That is, a phase difference corresponding to one turn occurs between the main spindle driving gear 17 and the feed gear 22, so that the tool slide rest 36 is fed inwards by the cam groove 43 (detailed in FIG. 7) and the above-mentioned phase difference in rotation between the two gears 17 and 22.

With the phase difference in rotation between the two gears 17 and 22, the cam follower 44 normally urged by the compression spring 45 against the cam surface of the cam groove 43 is moved to engage with the rapid traverse lead portion 43a of the cam groove 43 following the zero lead portion 43e of the same so that the cutting tool 38 is rapidly advanced together with the tool slide rest 36 by the rapid traverse lead portion 43a in the direction to approach the crank-pin 5b (#4P). When the cam follower 44 is shifted onto the cut-and-feed lead portion 43b, the tool slide rest 36 comes into a cut-and-feed state in which the in-feed quantity is small so that the external circumference of the crank-pin 5b (#4P) is cut by the cutting tool 38. In the region of the next dowel lead portion 43c, the external circumference of the crank-pin 5b is finished accurately to a desired size. When the cam follower 44 is engaged with the quick return lead portion 43d which follows the dowel lead portion 43c, the tool slide rest 36 is quickly returned back together with the cutting tool 38 in the direction to separate them from the crank-pin 5b (#4P) which has been completely machined.

The speed pattern of the servo-motor 25 in the above-described cutting cycle is shown in the lower part of FIG. 7. The servo-motor 25 rotates at a fixed high speed $V_2$ when the relative shifting angle between the two gears 17 and 22 is within a range of from $\theta_1$ to $\theta_2$.

On the other hand, when the tool slide rest 36 begins to be shifted into the quick return state after completion of cutting the crank-pin 5a with a fixed dimension, the disc 143 rotated through the pinion gear 24, the worm 140, the gear 141 and the shaft 142 turns once, so that the dog 145 of the disc 143 strikes the limit switch 144 to actuate the limit switch 144 to produce an ON-signal. The ON-signal of the limit switch 144 is applied to a controller (not shown) for the servo-motor 25 so that the servo-motor 25 is rapidly braked so as to change the rotational speed of the servo-motor 25 to a predetermined low speed $V_1$. Thereafter, when the quick return operation of the tool slide rest 36 is carried out and the relative shifting angle between the two gears 17 and 22 reaches 360°/n, that is, an angle $\theta_3$ at which one cycle of the motion of the cutting tool 38 is completed, the dog 146 provided at the tool slide rest 36 strikes the limit switch 147 to actuate the limit switch 147 to produce an ON-signal. The ON-signal of the limit switch 144 is applied to the controller for the servo-motor 25 so as to cause the servo-motor 25 to stop.

The stop position of the servo-motor 25 at this time is a position having a rotational phase difference of 180° with respect to the counterweight of the crank-shaft 5, and the cutting tool 38 and the crank-pin 5b (#4P) will have positional relation as shown in FIG. 4. This is because, if the stop position is largely displaced from the above-described position, the cutting tool 38 and the crank-shaft 5 interfere with each other when the machining unit 12 is moved in the axial direction of the crank-shaft 5.

Even if the stop position of the hollow main spindle 15 is normal, the hollow main spindle 15 is turned once in the condition of a low speed with limited torque at the start of the servo-motor 25 to thereby check whether the cutting tool 38 and the crank-shaft 5 are normally located in consideration that the positioning of the tool unit 12 in the longitudinal direction of the crank-shaft may be poor or that the positioning of the crank-shaft 5 in the rotational direction may be poor. Control in such a case is attained by a timer not shown and corresponds to the range of from $\theta_0$ to $\theta_1$ in FIG. 7.

If the crank-shaft 5 and the cutting tool 38 interfere with each other while the hollow main spindle 15 turns once, the rotation of the hollow main spindle 15 stops at the time of interference. Accordingly, the hollow main spindle 15 does not make one rotation even if time passes over the set time in the timer, so that such an abnormal condition can be easily detected and the stopping of the cutting cycle of the machine tool can be easily performed.

In the case where the third pin (#1P) of the crank-shaft 5 is cut, the servo-motor 9 is operated to move the saddle 8 form #4P to #1P, and the cutting tool 38 is positioned so as to be enabled to cut #1P. Thereafter, the servo-motor 25 is operated in the same manner as described above to thereby perform desired cutting machining.

In the case where the #2P and #3P are cut, the indexing mechanisms for the respective chucks 6 and 7 are operated to perform 180° turn indexing of the crank-shaft 5 so that the crank-pins 5b of #2P and #3P are located at the rotational center of the hollow main spindle 15. Thereafter, the servo-motors 9 and 25 are operated in the same manner as described above to thereby cut the #2P and #3P.

Although the embodiment described above shows the case where one machining unit 12 is provided at the side of the first tail stock 3, the present invention is applicable to the case where another machining unit constructed in the same manner as the machining unit 12 is further disposed at the side of the second tail stock 4 so as to be at a point symmetrical with respect to the machining unit 12, so that the two machining units are independently or simultaneously operated to cut the crank-shaft 5.

It is a matter of course that the tool slide rest according to the invention is not limited to the cutting machining for crank-pins of a crank-shaft as described above but the invention is applicable to the cutting machining for other shaft-like work-pieces, such as a cylindrical cam, and the like.

As described above, according to the present invention, a main spindle driving gear for rotating a cutting tool around a shaft-like object supported at its opposite ends and a feed gear for inwardly feeding the cutting tool are coaxially relatively rotatably provided, the two gears being formed with different numbers of teeth so that a rotational phase displacement occurs between the two gears when the gears are rotated through a common pinion gear by the motor which drives the main spindle. By using the rotational phase displacement, a tool slide rest provided at the main spindle driving gear so as to be movable in the diametrical direction is fed inwards by the in-feed cam groove annularly formed in the feed gear. Accordingly, the tool feeding mechanism can be simplified, miniaturized, reduced in weight, and improved in rotational balance, so that the main spindle can be made to rotate at a high speed, and hence the machining operation can be improved in speed as well as in efficiency.

In order to improve efficiency in machining a shaft-like work-piece, such as the previously described machine tool cutting crank-pins of a crank-shaft, it is desired that the rotating cutting tool sliding mechanism incorporated in the turning tool head is simplified in structure and reduced in weight.

The present application has described a machine tool of the type in which a tool is turned with a work-piece held stationarily and which satisfies the above requirements. This machine tool is arranged such that a main spindle driving gear and a feed gear having teeth smaller in number than the teeth of the main spindle driving gear are made coaxial with each other and are arranged to be rotated through one and the same gear train to thereby produce a rotational phase displacement between the two gears. As a result, the motion of this rotational phase displacement is utilized to feed a cutting tool slide rest disposed on the main spindle driving gear inwards through a cam groove formed in the feed gear and a cam follower engaged with the cam groove. This machine tool also has a one-cycle detecting mechanism for detecting one cycle of machining of the shaft-like work-piece by means of the above-mentioned in-feed operation. The one-cycle detecting mechanism is constituted by a reduction gear train including a worm, a worm gear and the like to reduce the rotational speed of the main spindle, a dog disc rotated by the reduction gear train, a limit switch operated by the dog disc, and so on.

Because the one-cycle end point detecting mechanism in such a machine tool slide device a described above is constituted by a reduction gear train including a worm, a worm gear and the like, a dog disc, and the like, the machine tool has disadvantages in that a large space is required for the arrangement of these parts, in that the arrangement in the vicinity of the main spindle becomes complicated, and in that a safety mechanism for cutting tool feeding cannot be provided.

That is, when the feeding of the cutting tool relative to the slide rest becomes overloaded due to abrasion or breakdown of the cutting tool, the rotational phase displacement between the main spindle driving gear and the feed gear is not produced so that the feeding of the slide rest stops. However, the rotation is still continued, so that the rotation is transmitted to the dog disc through the reduction gear train, and there arises a gap between the actual cutting tool feed position and the cycle position detected by the dog disc.

Another embodiment of the invention will be described in detail with reference to the drawings.

Figure 8:
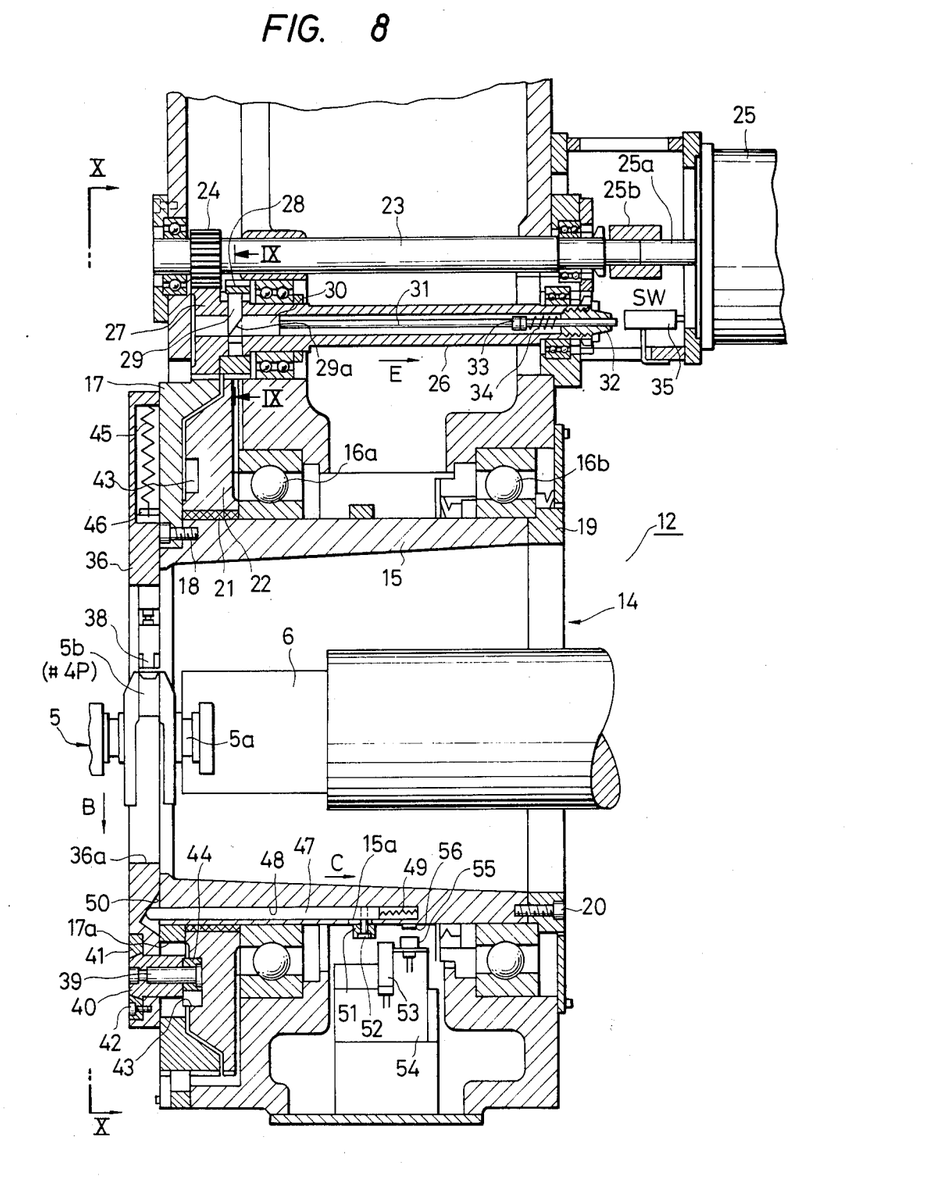
FIG. 8 is a sectional view showing an example of the tool slide device according to a second embodiment of the invention.
Figure 9:
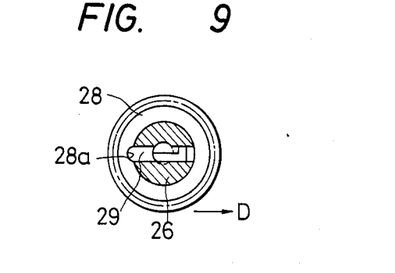
FIG. 9 is a sectional view along the line IX—IX of FIG. 8.
Figure 10:
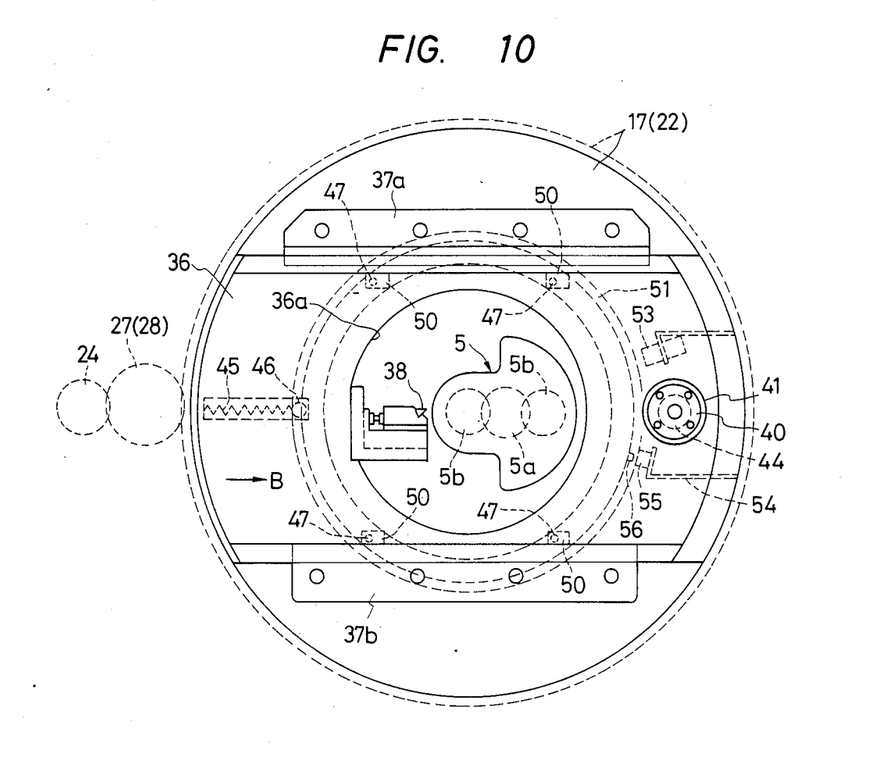
FIG. 10 is a side view along the line X—X of FIG. 8.

The overall structure is the same as in the first embodiment and is thus also illustrated in FIGS. 1, 2 and 3. FIGS. 8 to 10 show the details of an additionally included one-cycle termination detecting mechanism and a tool sliding mechanism in the tool slide mechanism according to the invention.

As shown in FIG. 8, ring-like feed gear 22 is fitted to the circumference of a collar 21 fitted to the front end circumference of the hollow main spindle 15 so that the feed gear 22 is rotatable relative to the hollow main spindle 15. The feed gear 22 has a diameter equal to the diameter of the main spindle driving gear 17 and teeth which are reduced in number by one or more from those of the main spindle driving gear 17. A drive shaft 23 is rotatably supported by the machining unit body 14. A pinion gear 24 is fixed to one end of the drive shaft 23. The other end of the drive shaft 24 is connected to a rotary shaft 25a of a servo-motor 25 fixedly attached to the rear surface of the machining unit body 14 by a coupling 25b.

A hollow intermediate shaft 26 is disposed between the drive shaft 23 and the hollow main spindle 15 and is rotatably supported on the machining unit body 14. A first intermediate gear 27 engaged with both the pinion gear 24 and the main spindle driving gear 17 is fixedly attached to one end of the intermediate shaft 26. Furthermore, a second intermediate gear 28 having teeth equal in number to the teeth of the first intermediate gear 27 and engaged with the feed gear 22 is connected to the one end of the intermediate shaft by a slide pin 29. The slide pin 29 slidably passes through the intermediate shaft 26 in its diametric direction and has one end fitted to a concavity 28a formed in an inner side of the second intermediate gear 28, as shown in FIG. 9. As a result the second intermediate gear 28 is connected to the intermediate shaft 26. Furthermore, the slide pin 29 has an inclined surface 29a. A pressing pin 30 having an end inclined surface engaged with the inclined surface 29a is longitudinally slidably inserted into the hollow intermediate shaft 26. One end of an operation rod 31 inserted into the hollow intermediate shaft 26 is connected to the pressing pin 30 and the other end of the operation rod 31 passes through a load adjusting screw 32 fitted to an opening at the other end of the intermediate shaft 26 and extends out of the intermediate shaft 26. A compression spring 34 is interposed between a nut 33 disposed on the intermediate shaft 26 and thread-engaged with the operation rod 31 and the load adjusting screw 32. The spring 34 urges the pressing pin 30 against the slide pin 29 so that the top end of the slide pin 29 is in forced contact with the concavity 28a of the intermediate gear 28.

When the feed gear 22 is overloaded and is rotated integrally with the main spindle gear 17 due to the disappearance of the rotational phase displacement between the gears, the second intermediate gear 28 is rotated relative to the intermediate shaft 26 to thereby press the slide pin 29. The motion of the slide pin 29 is transmitted to the operation rod 31 to thereby operate a switch 35 disposed in opposition to the outwards extending end of the operation rod 31. In short, the intermediate gear 28, the slide pin 29, the push pin 30, the operation rod 31, the spring 34, and the switch 35 make up a safety mechanism and an overload detecting mechanism in the case where the feeding becomes overloaded. Accordingly, when the switch 35 is operated, these mechanisms function as an emergency mechanism for stopping the machine tool.

According to the fourth aspect of the invention, when the feeding of the cutting tool becomes overloaded owing to abrasion or breakdown of the cutting tool, the phase displacement in rotation between the main spindle driving gear and the feed gear becomes zero. Accordingly, a displacement in rotation occurs between the intermediate gears respectively engaged with the main spindle driving gear and the feed gear. The overload detecting mechanism detects the last-mentioned rotational displacement and issues an emergency order to stop the machine tool. Accordingly, the breakdown and deformation of work-pieces to be machined and the breakdown and deformation of parts such as a cutting tool sliding means and the like, can be prevented.

As described above, according to the present invention, the main spindle driving gear and the feed gear are driven through intermediate gears concentrically disposed and provided with the same number of teeth, and an overload detecting mechanism is provided so that the mechanism is operated in response to a rotational displacement caused between the intermediate gears when cutting resistance become larger than feed power owing to a rotational phase displacement between the main spindle driving gear and the feed gear or in other words when the rotational phase displacement between the gears becomes zero, to detect the overload of the feeding of the cutting tool to thereby stop the machine tool in an emergency. Accordingly, the safety of the machine tool can be maintained even if the feeding of the cutting tool is overloaded owing to the abrasion or breakdown of the cutting tool. Furthermore, the deformation or breakdown of work-pieces to be machined and the deformation or breakdown of parts such as sliding means and the like can be prevented.

In the following, the one-cycle detecting mechanism in crank-pin machining, directly using the motion of the slide rest 36, is described in detail.

As shown in FIGS. 8 and 10, the one-cycle termination detecting mechanism has four rods 47 circumferentially provided on the hollow main spindle 15 so as to be arranged at intervals of 90 degrees. The rods 47 are respectively slidably inserted into four holes 48 each bored with a suitable depth longitudinally starting form the front end surface (main spindle driving gear 17) of the hollow main spindle 15. The rods 47 are respectively biased by compression springs 49 respectively mounted within the holes 48 so that the respective rods 47 are urged against the back surface of the slide rest 36. Inclined grooves 50 are formed in the back surface of the slide rest 36 against which the projecting tip end of the respective rods 47 are forced in contact so that tip ends of the respective rods 47 are urged to engaged with the respective inclined groove 50 to thereby convert the motion of the slide rest 36 into the axial motion of the respective rods 47 along the hollow main spindle 15. A ring 51, which is axially slidably put on the circumference of the hollow main spindle 15, is fixed to the respective rods 47 by a set screw 52 through a long hole 15a formed in the hollow main spindle 15. A contactless switch 53 operates upon detection of the position of the ring 51. The switch 53 is disposed on the circumference of the hollow main spindle 15 and attached to a supporting member 54. A position sensor 55 is attached to the supporting member 54 for stopping the hollow main spindle 15 at a fixed position. A fixed-position stoppage member 56 for actuating the position sensor 55 is fixedly attached to the outer circumferential surface of the hollow main spindle which is in opposition to the position sensor 55.

When the servo-motor 25 for cutting operation is operated owing to the setting of the cutting mode of the machine tool, the rotation of the motor 25 is transmitted to both the main spindle driving gear 17 and the feed gear 22 through the drive shaft 23, the pinion gear 24 and the intermediate gears 27 and 28. Accordingly, the main spindle driving gear 17 rotates together with the hollow main spindle 15, and, at the same time the feed gear 22 rotates around the collar 21.

When the slide rest 36 is fed inwards in the direction of the arrow B of FIG. 10, the respective rods 47 urged against the inclined grooves 50 move in the direction of the arrow C of FIG. 8, and, at the same time, the ring 51 moves in the same direction. When the slide rest 36 begins to be shifted into the quick return state after the cutting of the crank-pin 5b has been finished to a desired dimension, the ring 51 begins to be moved in the direction opposite to the arrow C in response to the motion of the tool slide rest 36. The contactless switch 53 detects the reverse movement of the ring 51 and a signal is sent from the contactless switch 53 to a control circuit (not shown) for the servo-motor 25, so that the servo-motor 25 is rapidly braked and the rotational speed of the servo-motor 25 is changed to a predetermined low speed $V_1$ predetermined as shown in FIG. 7. Thereafter, when the relative rotational displacement between the two gears 17 and 22 is changed into 360°/n, that is, an angle $\theta_3$ indicating the completion of one cycle motion of the cutting tool 38 after the quick return operation of the slide rest 36, the position sensor 55 detects the fixed-position stoppage member 56. The signal from the position sensor 55 is applied to the control circuit to thereby rapidly brake the servo-motor 25 for stopping the hollow main spindle 15 at a fixed position.

In the case where the cutting resistance greatly increases owing to abrasion or breakdown of the cutting tool 38 in the cycle of cutting the crank-pins 5b so that the feeding force for the slide rest 36 becomes larger than the feeding force owing to the rotational phase displacement between the main spindle driving gear and the feed gear 22 to overload the feeding, the cam follower 44 and the cam groove 43 are changed into a locked state and the main spindle driving gear 17 and the feed gear 22 then move together. Accordingly, both the gear 17 and 22 are integrally rotated without generating any rotational phase displacement therebetween. Accordingly, rotational displacement occurs between the first and second intermediate gears 27 and 28 respectively engaged with the main spindle driving gear 17 and the feed gear 22. Accordingly, the second intermediate gear 28 begins to rotate relative to the first intermediate shaft 26 so that the slide pin 29 put in the concavity 28a of the second intermediate gear 28 moves in the direction of the arrow D of FIG. 6 against the spring 34. The pressing pin 30 fitted with the inclined surface 29a and the operation rod 31 connected thereto are slid in the direction of the arrow E of FIG. 8 so that the switch 35 is turned on. After the switch 35 is turned on, the ON-signal is fed from the switch 35 to the control circuit (not shown) for the machine tool to thereby effect an emergency stop of the machine tool. Accordingly the bending injury or destruction of parts such as sliding mechanism owing to the overload can be prevented.

The overload adjustment with respect to the feed gear 22 can be attained by adjusting the spring pressure of the spring 34 through the adjusting screw 32.

Because the movement of the slide rest 36 is directly converted into the movement of the one-cycle detection ring 51, the ring 51 stops immediately when the feeding of the slide rest 36 stops owing to overload. That is, there arises no displacement between the ring 51 and the point where one-cycle motion is terminated and the ring 51. Accordingly, even in such a machine tool that has a sliding mechanism for producing a feeding motion by use of the rotational phase displacement between the main spindle driving gear 17 and the feed gear 22, a safety mechanism for feeding operation can be provided.

It is a matter of course that the tool sliding device according to the invention is not limited to the case of cutting crank-pins of a crank-shaft as described above but the invention is applicable to the case of cutting other shaft-like work-pieces, such as a cylindrical cam and the like. Furthermore, the one-cycle detecting mechanism is not limited to the combination having the inclined grooves 50 formed in the back surface of the slide rest 36 and the rods 47 fitted thereto as described above, but any mechanism may be used as long as the mechanism and be operated in response to the motion of the slide rest 36.

As described above, according to the present invention, the slide device operates a slide rest by use of a rotational phase displacement between a main spindle driving gear and a feed gear. The slide device can be provided with a mechanism for detecting one cycle of the feeding motion of a cutting tool with respect to a work-piece by direct use of the motion of the slide rest. Accordingly, the effects of the invention are that such speed-reduction gears as conventionally used for detecting one cycle by use of the rotation of the main spindle are not required, that the arrangement in the vicinity of the main spindle is simplified, and that a safety mechanism for feeding can be provided.

Figure 12:
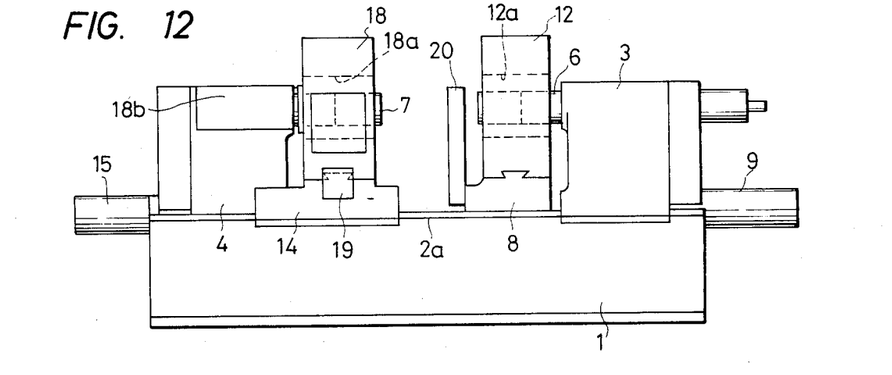
FIG. 12 is a front view of the same.
Figure 13:
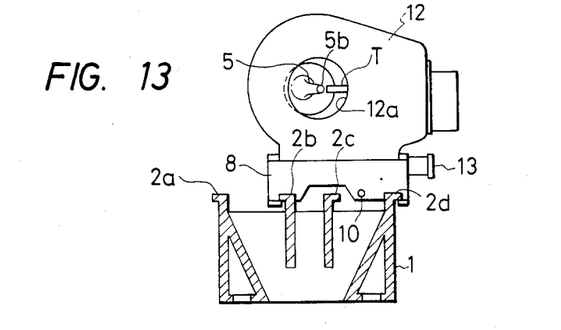
FIG. 13 is a sectional view taken along the line XIII—XIII of FIG. 11.

A third embodiment of the invention will be described in detail with reference to FIGS. 11 to 13. This third embodiment shows many similarities to the first embodiment.

Just as in the first embodiment, the machining unit 12 which turns around the crank-pins 5b of the crank-shaft 5 to cut, for example, the third and the fourth pins 5b (#3P and 4P) is disposed on the first saddle 8 so as to be movable in the direction perpendicular to the direction of movement of the saddle 8. The machining unit 12 is moved by the hydraulic cylinder 13 or the like provided on the saddle 8.

Additionally, a second saddle 14 is located between the tail stocks 3 and 4 near the second tail stock 3 and is disposed over both the first and third guide surfaces 2a and 2c of the bed 1 so as to be longitudinally movable relative to the bed 1. Similarly to the first saddle 8, the second saddle 14 is provided with a servo-motor 15, a ball screw 16 rotated by the servo-motor 15, and a ball nut 17 fitted to the ball screw 16 and fixed to the saddle 14. A second machining unit 18 is disposed on the second saddle 14 so as to be movable in the direction perpendicular to the direction of movement of the saddle 14. The second machining unit 18, which turns around the crank-shaft 5, to cut, for example, the first and the second pins 5b (#1P and #2P), has a hydraulic cylinder 19 for performing moving operation similarly to the first machining unit 12. The first and second machining units 12 and 18 have insertion holes 12a and 18a for inserting chucks 6 and 7 of the first and second tail stocks 3 and 4 therein, respectively. Tool heads (not shown) rotated around the crank-shaft 5 and simultaneously fed inwards in the diametrical direction of the crank-shaft 5 are mounted on the inner side of the insertion holes 12a and 18a, respectively. In FIGS. 11 and 12, an anti-vibration unit 20 is mounted on the work side of the first saddle 8 to prevent the vibration of the crank-shaft 5. The anti-vibration unit 20 has pressing metal bearings 20a and 20b for holding the journal 5a of the crank-shaft 5 therebetween.

In the following, the operation of the thus arranged embodiment is described in detail.

Figure 11:
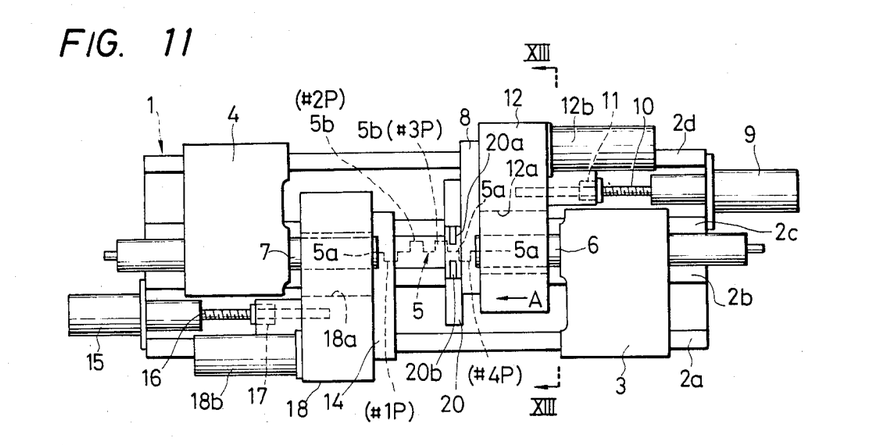
FIG. 11 is a plan view of a shaft-like work-piece machining apparatus according to the invention.

When all of the crank-pins 5b are to be cut by the first machining unit 12, the servo-motor 9 is first operated to rotate the ball screw 10 to thereby move the saddle 8 in the direction of the arrow A of FIG. 11 on the second and fourth guide surfaces 2a and 2d so that the cutting tool T is positioned in opposition to one of the crank-pins 5b, for example, #4P. After the positioning of the cutting tool T relative to the #4P crank-pin 5b the hydraulic cylinder 13 is operated to move the first machining unit 12 to a position near to the outer circumference of the #4P crank-pin 5b so that the mode of the machine tool is shifted into a crank-pin cutting mode. At this time, the pressing metal bearing 20a and 20b are urged against a journal between the #3P and #4P crank-pins 5b.

The servo-motor 12b for cutting operation is started in response to the setting of the machine tool to the cutting mode so that the cutting tool T in the tool head (not shown) of the machining unit 12 rotates around the #4P crank-pin 5b while being fed inwards. Thus, the #4P crank-pin 5b is machined. After completion of cutting of the #4P crank-pin 5b, the tool head is stopped at a fixed position to release the anti-vibration pressing metals 20a and 20b. Thereafter, the first saddle 8 is moved again by the servo-motor 9 to make positioning of the tool head so as to come in opposition to the #1P crank-pin 5b. The tool head thus positioned is operated again to cut the #1P crank-pin 5b.

In the case where the #2P and #3P crank-pins 5b and 5b are cut next, the crank-shaft 5 is rotated by 180 degrees by the index mechanism of the chucks 6 and 7 to make the center lines of the #2P and #3P crank-pins 5b and 5b agree with the turning center of the tool T of the machining unit 12. The servo-motor 12b of the machining unit 12 is operated to cut the #2 crank-pin 5b in the same manner as described above and thereafter cut the #3P crank-pin 5b. Thus, the cutting of all the crank-pins 5b of the crank-shaft 5 is completed.

All the crank-pins 5b can be cut by use of the second machining unit 18. In this case, the saddle 14 is operated together with the machining unit 18 in the same manner as described above with respect to the first saddle 8 together with the machining unit 12, and therefore description thereof will be omitted.

When the crank-pins 5b of the crank-shaft 5 are to be cut by both the first and second machining units 12 and 18, for example, the #4P and #3P crank-pins 5b are cut by the use of the first machining unit 12 and the #1P and #2P crank-pins 5b are cut by the use of the second machining unit 18 through the indexing mechanisms of the chucks 6 and 7 in the same manner as described above. In this case, the #1P and #4P crank-pins 5b are simultaneously cut by the use of both the machining units 12 and 18, whereafter the #2P and #3P crank-pins 5b and 5b are simultaneously cut by the use of both the machining units 12 and 18.

The embodiment as directly described above has an advantage that the cycle time required for cutting all the crank-pins can be shortened because the two machining units 12 and 18 are used for machining the crank-pins. Furthermore, because the pair of tail stocks 3 and 4, the pair of machining units 12 and 18, and the pair of saddles 8 and 14 are disposed on the four parallel guide surfaces 2a to 2d so a to be formed like a swastika pattern, and because one of the tail stocks 3 and 4 and adjacent one of the saddles 8 and 14 are disposed to slide on independent guide surfaces, telescopic covers for protecting the guide surfaces 2a to 2d to the bed 1 from the influence of metal chips can be easily provided so that the respective tail stock 3 and 4 and the respective saddle 8 and 14 do not interfere with each other even if they approach each other. Accordingly, abrasion of the guide surfaces and partial pressing of the guide surface can be remarkably reduced compared with those in the prior art type guide surfaces which are commonly used for both the tail stock and the saddle. Furthermore, because the respective tail stocks 3 and 4 and the respective saddles 8 and 14 have not a span longer than they need, saddles or the like for supporting them can be reduced in size. Furthermore, because the saddles together with the tail stocks and the machining units are respectively independently loaded on the guide surfaces, the load on the guide surfaces can be reduced compared with the prior art. Accordingly, not only the guide surfaces can be reduced in size but the bed can be reduced in size as well as in weight.

The machining unit according to the present invention is not limited to the above-described embodiment applied to the cutting of the crank-shaft. For example, it is matter of course that the invention is applicable to the cutting of other shaft-like work-pieces, such as a cylindrical cam, and the like. In addition, the number of the guide surfaces is not limited to the embodiment having four guide surfaces, and also the number of the machining units is not limited to the embodiment.

As described above, according to the present invention in which pairs of parallel guide surfaces are formed in parallel to the bed so as to dispose one of the tail stocks between two guide surfaces and dispose adjacent one of the machining units between different two guide surfaces, abrasion of the respective guide surface can be remarkably reduced. Accordingly, high machining accuracy can be maintained, and the support part for the tail stocks and the machining units can be reduced in size. Accordingly, the load on the guide surfaces can be reduced, and the guide surfaces can be reduced in size as well as in weight easily.

What is claimed is:

1. A tool slide device in a machine tool, comprising:
a hollow main spindle rotatably disposed on a machining unit body;
a main spindle driving gear concentrically and fixedly mounted on said hollow main spindle;
a feed gear mounted on said hollow main spindle in opposition to said main spindle driving gear and rotatable relative to said hollow spindle, said feed gear having teeth differing in number from teeth of said spindle driving gear;
a motor for rotatably driving said spindle driving gear and said feed gear;
a feed slide disposed on said spindle driving gear and movable in a radial direction of said main spindle driving gear, said feed slide having a cutting tool projecting toward an outer circumference of a shaft-like work-piece to be machined;
an in-feed cam groove annularly formed in said feed gear; and
a cam follower attached to said feed slide and biased against said cam groove so as to engage therewith, wherein said tool slide device further comprises:
mechanical means directly responsive to a motion of said feed slide for detecting a point of a cycle of sliding motion of said cutting tool owing to a relative rotational displacement between said main spindle driving gear and said feed gear.

2. A machining apparatus including a tool slide device, said tool slide device comprising:
a hollow main spindle rotatably disposed on a machining unit body;
a main spindle driving gear concentrically and fixedly mounted on said hollow main spindle;
a feed gear mounted on said hollow main spindle in opposition to said main spindle driving gear and rotatable relative to said hollow spindle, said feed gear having teeth differing in number from teeth of said spindle driving gear;
a motor for rotatably driving said spindle driving gear and said feed gear;
a feed slide disposed on said spindle driving gear and movable in a radial direction of said main spindle driving gear, said feed slide having a cutting tool projecting toward an outer circumference of a shaft-like work-piece to be machine;
an in-feed cam groove annularly formed in said feed gear; and
a cam follower attached to said feed slide and biased against said cam groove so as to engage therewith, and said machining apparatus further comprises:
first and second tail stocks for supporting opposite ends of said shaft-like work-piece;
first and second machining units disposed at different positions between said first and second tail stocks, each said machining unit comprising a respective one of said hollow main spindle, main spindle driving gear, feed gear, motor, tool slide rest, in-feed cam groove and cam follower; and
first and second pairs of parallel guide surfaces, each extending in an axial direction of said shaft-like work-piece and each being formed on a bed, for guiding said tail stocks and said machining units for movement along said bed, wherein said tail stocks and said machining units are arrange in a staggered manner with said first tail stock and said first machining unit being disposed on said first pair of guide surfaces and said second tail stock and said second machining unit being disposed on said second pair of guide surfaces.

3. A machining apparatus according to claim 2, wherein said first machining unit is closer to said first tail stock than said second machining unit, and one of the guide surfaces of said first pair of guide surfaces is disposed between the guide surfaces of said second pair of guide surfaces.

4. A machining apparatus, comprising:
first and second tail stocks for supporting opposite ends of a shaft-like work-piece to be machined;
first and second machining units for machining an outer circumference of said work-piece and disposed at different positions between said tail stocks; and
first and second pairs of parallel guide surfaces mounted on a bed for guiding said tail stocks and said machining units to be movable along said bed, wherein said first tail stock is mounted on one of said first and second pairs of guide surfaces and said first machining unit is mounted on the other of said first and second pairs of guide surfaces, and said second machining unit is mounted on one of said first and second pairs of guide surfaces and said second tail stock is mounted on the other of said first and second pairs of guide surfaces.

5. A machining apparatus according to claim 4, wherein said first machining unit is closer to said first tail stock than said second machining unit and one of the guide surfaces of said first pair of guide surfaces disposed between the guide surfaces of said second pair of guide surfaces.

6. A tool slide device in a machine tool, comprising:
a hollow main spindle rotatably disposed on a machining unit body;
a main spindle driving gear concentrically and fixedly mounted on said hollow main spindle;
a feed gear mounted on said hollow main spindle in opposition to said spindle driving gear and rotatable relative to said hollow main spindle, said feed gear having teeth differing in number from teeth of said spindle driving gear;
a motor for rotatably driving said spindle driving gear and said feed gear;
a feed slide disposed on said spindle driving gear and movable in a radial direction of said spindle driving gear, said feed slide having a cutting tool projecting toward an outer circumference of a shaft-like work-piece to be machined;
an in-feed cam groove annularly formed in said feed gear;
a cam follower attached to said feed slide and biased against said cam groove so as to engage therewith; and
a mechanism directly responsive to a motion of said feed slide for detecting a point of cycle of sliding motion of said cutting tool owing to a relative rotational displacement between said main spindle driving gear and said feed gear,
wherein said detecting mechanism comprises:
a plurality of rods axially slidably mounted on said hollow main spindle;
inclined grooves formed in said feed slide so as to be in forced contact with first ends of respective ones of said rods so as to cause said respective rods to move linearly;
a ring rigidly connected to said rods; and
a switch for detecting the motion of said ring to thereby issue a command of detecting said cycle point.

7. A tool slide device in a machine tool, comprising:
a hollow main spindle rotatably disposed on a machining unit body;
a main spindle driving gear concentrically and fixedly mounted on said hollow main spindle;
a feed gear mounted on said hollow main spindle in opposition to said spindle driving gear and rotatable relative to said hollow main spindle, said feed gear having teeth differing in number from teeth of said spindle driving gear;
a motor for rotatably driving said spindle driving gear and said feed gear;
a feed slide disposed on said spindle driving gear and movable in a radial direction of said spindle driving gear, said feed slide having a cutting tool projecting toward an outer circumference of a shaft-like work-piece to be machined;
an in-feed cam groove annularly formed in said feed gear;
a cam follower attached to said feed slide and biased against said cam groove so as to engage therewith;
first and second intermediate gears having teeth the same in number as each other, said first and second intermediate gears being disposed for separately transmitting the rotation of said motor to said main spindle driving gear and said feed gear respectively;
an overload detecting mechanism arranged to be operated in response to a relative displacement in rotation between said intermediate gears when cutting resistance of said tool against said work-piece becomes larger than a feed power of said feed gearing; and
means for generating a signal indicating overload in response to operation of said overload detecting mechanism.

8. A tool slide device according to claim 7, wherein said overload detecting mechanism operates in response to a relative rotational displacement between said main spindle driving gear and said feed gear becoming zero.

9. A tool slide device according to claim 8, wherein said overload detecting mechanism comprises:
a slide pin for selectively engaging a first intermediate gear engaged with said feed gear with a shaft of a second intermediate gear engaged with said main spindle driving gear; and
a spring urging said slide pin in a direction of engagement with said first intermediate gear, and
wherein said means for generating includes a switch means turned on and off in response to motion of said slide pin.

10. A machining apparatus as recited in claim 7, further comprising:
first and second tail stocks for supporting opposite ends of said shaft-like work-piece;
first and second machining units disposed at different positions between said first and second tail stocks, each said machining unit comprising a respective one of said hollow main spindle, main spindle driving gear, feed gear, motor, tool slide rest, in-feed cam groove and cam follower; and
first and second pairs of parallel guide surfaces, each extending in an axial direction of said shaft-like work-piece and each being formed on a bed, for guiding said tail stocks and said machining units to be movable along said bed, wherein said tail stocks and said machining units are arranged in a staggered manner with said first tail stock and said first machining unit being disposed on said first pair of guide surfaces and said second tail stock an said second machining unit being disposed on said second pair of guide surfaces.

* * * * *